US012603239B2

(12) United States Patent
Javora et al.

(10) Patent No.: US 12,603,239 B2
(45) Date of Patent: Apr. 14, 2026

(54) MEDIUM VOLTAGE OR HIGH VOLTAGE CIRCUIT BREAKER

(71) Applicant: ABB Schweiz AG, Baden (CH)

(72) Inventors: Radek Javora, Hrusovany u Brna (CZ); Dietmar Gentsch, Ratingen (DE)

(73) Assignee: ABB Schweiz AG, Baden (CH)

( * ) Notice: Subject to any disclaimer, the term of this patent is extended or adjusted under 35 U.S.C. 154(b) by 258 days.

(21) Appl. No.: 18/212,729

(22) Filed: Jun. 22, 2023

(65) Prior Publication Data

US 2023/0420202 A1 Dec. 28, 2023

(30) Foreign Application Priority Data

Jun. 23, 2022 (EP) .................................... 22180589

(51) Int. Cl.
*H01H 33/666* (2006.01)

(52) U.S. Cl.
CPC ... *H01H 33/666* (2013.01); *H01H 2033/6667* (2013.01); *H01H 2225/008* (2013.01)

(58) Field of Classification Search
CPC .... H01H 33/66; H01H 33/662; H01H 33/666; H01H 2033/6667; H01H 2033/6665; H01H 9/52; H01H 2009/523; H01H 2009/526; H01H 2225/008
USPC ......................................... 218/4–7, 120, 140
See application file for complete search history.

(56) References Cited

U.S. PATENT DOCUMENTS 3,597,556 A * 8/1971 Sharp ....................... H01H 3/46 218/4
3,697,819 A * 10/1972 Eichelberger .......... H02B 13/02 361/603
3,970,810 A * 7/1976 Carroll ................. H01H 33/666 313/231.01
4,027,123 A 5/1977 Ihara
4,550,234 A * 10/1985 Steinemer ............ H01H 33/666 218/4

(Continued)

FOREIGN PATENT DOCUMENTS

EP 2469561 A1 6/2012
JP 8-264084 A 10/1996

OTHER PUBLICATIONS

Translation of JPH08264084 (Original document published Oct. 11, 1996) (Year: 1996).*

(Continued)

*Primary Examiner* — William A Bolton

(74) *Attorney, Agent, or Firm* — Fitch Even Tabin & Flannery LLP

(57) ABSTRACT

A circuit breaker includes first and second terminals, first and second vacuum interrupters, an interconnection part, an actuator, an operating rod, and a lever system. The first terminal is connected to a fixed contact of the first vacuum interrupter. The second terminal is electrically connected to a fixed contact of the second vacuum interrupter. The interconnection part is associated with a movable contact of the first and second vacuum interrupters when the circuit breaker is in a closed state. A first end of a first lever arm is coupled to the movable contact, and a second end is coupled to the operating rod. When transitioning from an open to a closed state, the actuator moves the operating rod to move the second end of the first lever arm and the second end of the second lever arm.

13 Claims, 5 Drawing Sheets

(56) References Cited

U.S. PATENT DOCUMENTS

| | | | | |
|---|---|---|---|---|
| 7,790,997 | B2 * | 9/2010 | Girodet | H01H 33/42 218/7 |
| 10,957,505 | B2 * | 3/2021 | Chen | H01H 33/14 |
| 2008/0203062 | A1 | 8/2008 | Sato et al. | |
| 2018/0005784 | A1 * | 1/2018 | Nagatake | H01H 33/662 |
| 2021/0319963 | A1 * | 10/2021 | Kumar | H01H 31/003 |

OTHER PUBLICATIONS

European Patent Office, Extended European Search Report in European Patent Application No. 22180589.8, 7 pp. (Nov. 15, 2022).

* cited by examiner

- PRIOR ART -

MEDIUM VOLTAGE OR HIGH VOLTAGE CIRCUIT BREAKER

CROSS-REFERENCE TO RELATED APPLICATIONS

The instant application claims priority to European Patent Application No. 22180589.8, filed Jun. 23, 2022, which is incorporated herein in its entirety by reference.

FIELD OF THE DISCLOSURE

The present disclosure generally relates to a medium voltage or high voltage circuit breaker, and a medium voltage or high voltage switchgear.

BACKGROUND OF THE INVENTION

Vacuum interrupters are widely known in the industry, in the applications of low-; medium-; high-voltage circuit breakers.

FIG. 1 shows a standard design of a circuit breaker pole. The standard design of the circuit breaker pole has a housing 1, which provides for the proper positioning of internal parts, the upper terminal 2 and the lower terminal 6 provide an interface to the outer environment. The circuit breaker also has a vacuum interrupter (VI) 5 and a pushrod 7 transfers the movement of the actuator 8 into the VI. The VI 5 has one contact fixed contact 3) and one movable contact 4.

Movement of the moveable contact 4 is achieved through the push rod 7. The fixed contact 3 is both mechanically and electrically connected to the upper terminal 2. The moveable contact 4 is in electrical contact with lower contact 6. Mechanical fixation of the moveable contact 4 needs to allow for linear movement of this contact towards the fixed contact 3. The housing 1 is also used for improving the dielectric withstand of the whole interior assembly with respect to the surrounding electrical potentials. It is usually made of thermoplastic, duroplastic and/or thermoset material, which enables decreasing distances to the next phase(s) or grounded switchgear walls and provides for increasing creepage distances.

The success of these devices in medium voltage (MV) field has led to the desire the extension of their applications towards higher voltage levels as well. Vacuum interrupters designed for higher voltage levels are feasible, but they are expensive, and they are challenging to develop. When a VI is developed for high voltage applications, significant design effort is needed to improve heat dissipation from such a bulky unit. This, together with lower production volumes applicable, become critical factors when deciding whether such VIs can be utilized in new developments. Furthermore, high voltage applications require large distance from fixed to moveable contact in the open state, resulting in a long path the pushrod 7 needs to travel and subsequently in a big actuating mechanism 8 that has to drive the pushrod 7 in such a distance.

BRIEF SUMMARY OF THE INVENTION

In a first aspect, there is provided a medium voltage or high voltage circuit breaker; comprising:

a first terminal;

a second terminal;

a first vacuum interrupter;

a second vacuum interrupter;

an interconnection part;

an actuator;

an operating rod; and a lever system.

The first terminal is electrically connected to a first fixed contact of the first vacuum interrupter. The second terminal is electrically connected to a second fixed contact of the second vacuum interrupter. The interconnection part is configured to be in electrical connection with a first movable contact of the first vacuum interrupter and the interconnection part is configured to be in electrical connection with a second movable contact of the second vacuum interrupter. In the closed state the first and second movable contacts have been moved to be in contact with the respective first and second fixed contacts. The interconnection part is configured to provide a current path between the movable contacts. A first end of a first lever arm of the lever system is coupled to the movable contact of the first vacuum interrupter, and a second end of the first lever arm is coupled to the operating rod. A first end of a second lever arm of the lever system is coupled to the movable contact of the second vacuum interrupter, and a second end of the second lever arm is coupled to the operating rod. A slidable part at the first end of the first lever arm is supported by the interconnection part and can slide linearly within a slot of the interconnection part or a slidable part at the first end of the first lever arm is supported by the interconnection part and can move linearly with respect to a bearing of the interconnection part.

A slidable part at the first end of the second lever arm is supported by the interconnection part and can slide linearly within a slot of the interconnection part or a slidable part at the first end of the second lever arm is supported by the interconnection part and can move linearly with respect to a bearing of the interconnection part. In a transition from an open state to the closed state the actuator is configured to move the operating rod to move the second end of the first lever arm and the second end of the second lever arm such that the slidable part at the first end of the first lever arm and the slidable part at the first end of the second lever arm move simultaneously within their corresponding slots away from one another or with respect to their corresponding bearings away from one another.

It is to be noted that reference to an end of a lever arm does not require this to be right at the actual end but can be towards or near the actual end.

BRIEF DESCRIPTION OF THE SEVERAL VIEWS OF THE DRAWING(S)

FIGS. 3*a*, 3*b*, 3*c*, and 3*d* show an example of an interconnection part of a new design of a medium voltage or high voltage circuit breaker from difference perspectives, in accordance with the disclosure.

Figure 4A:
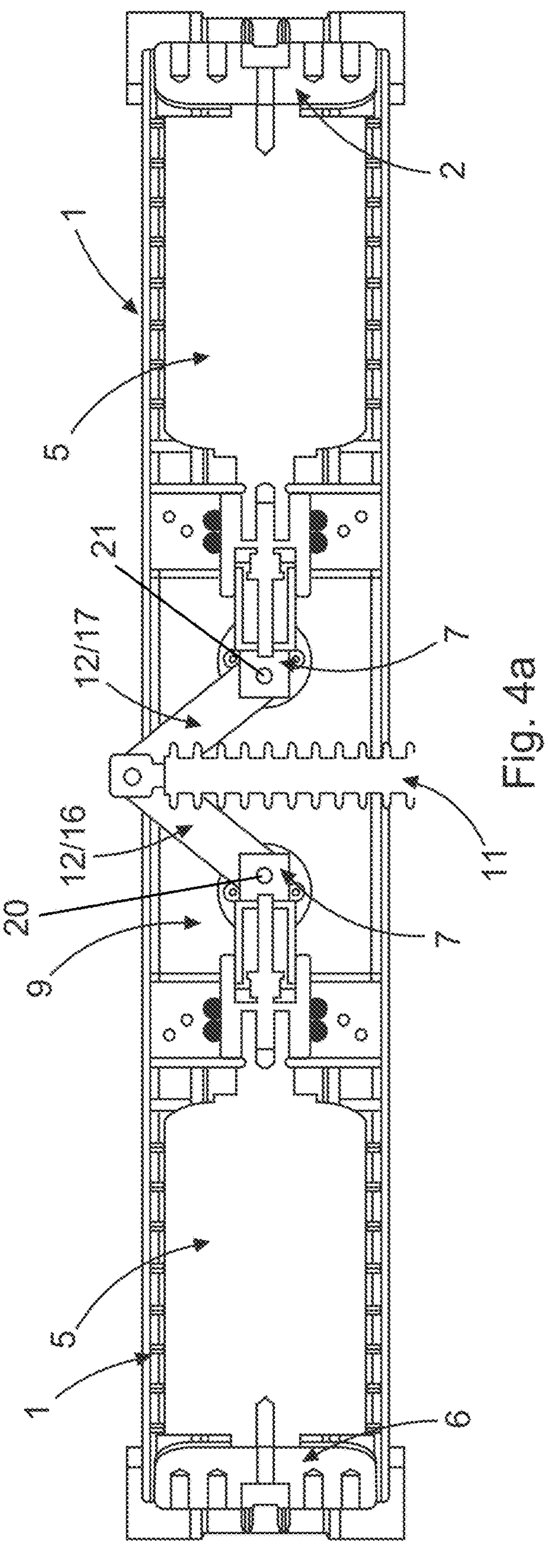
Figure 4B:
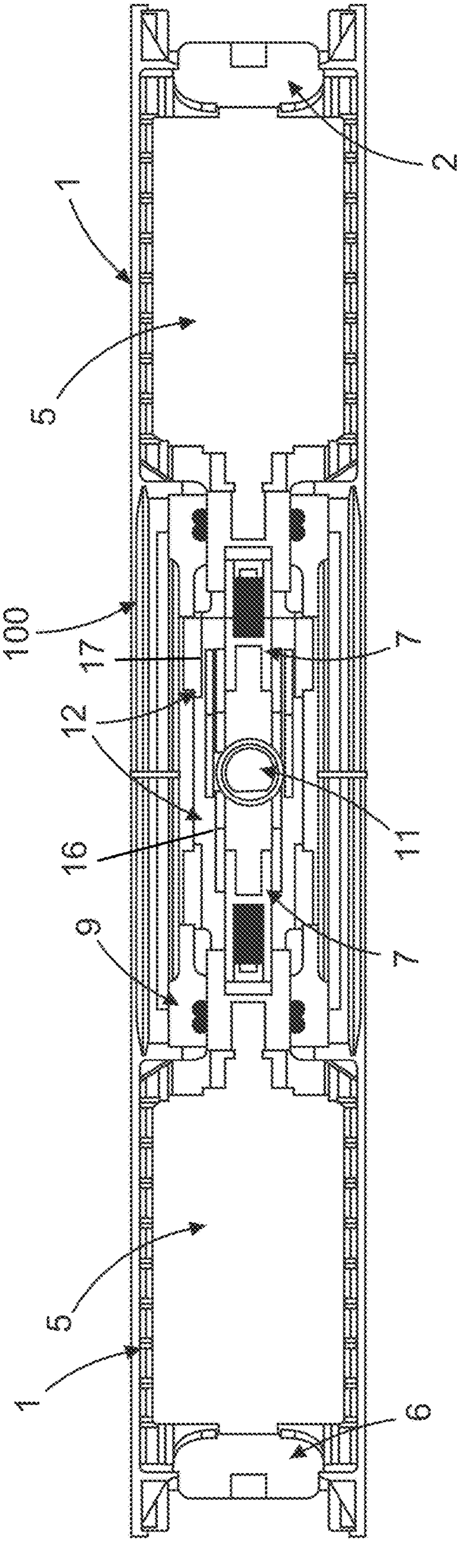

FIGS. 4*a* and 4*b* show views of an example of a new design of a medium voltage or high voltage circuit breaker, in accordance with the disclosure.

Figure 5:
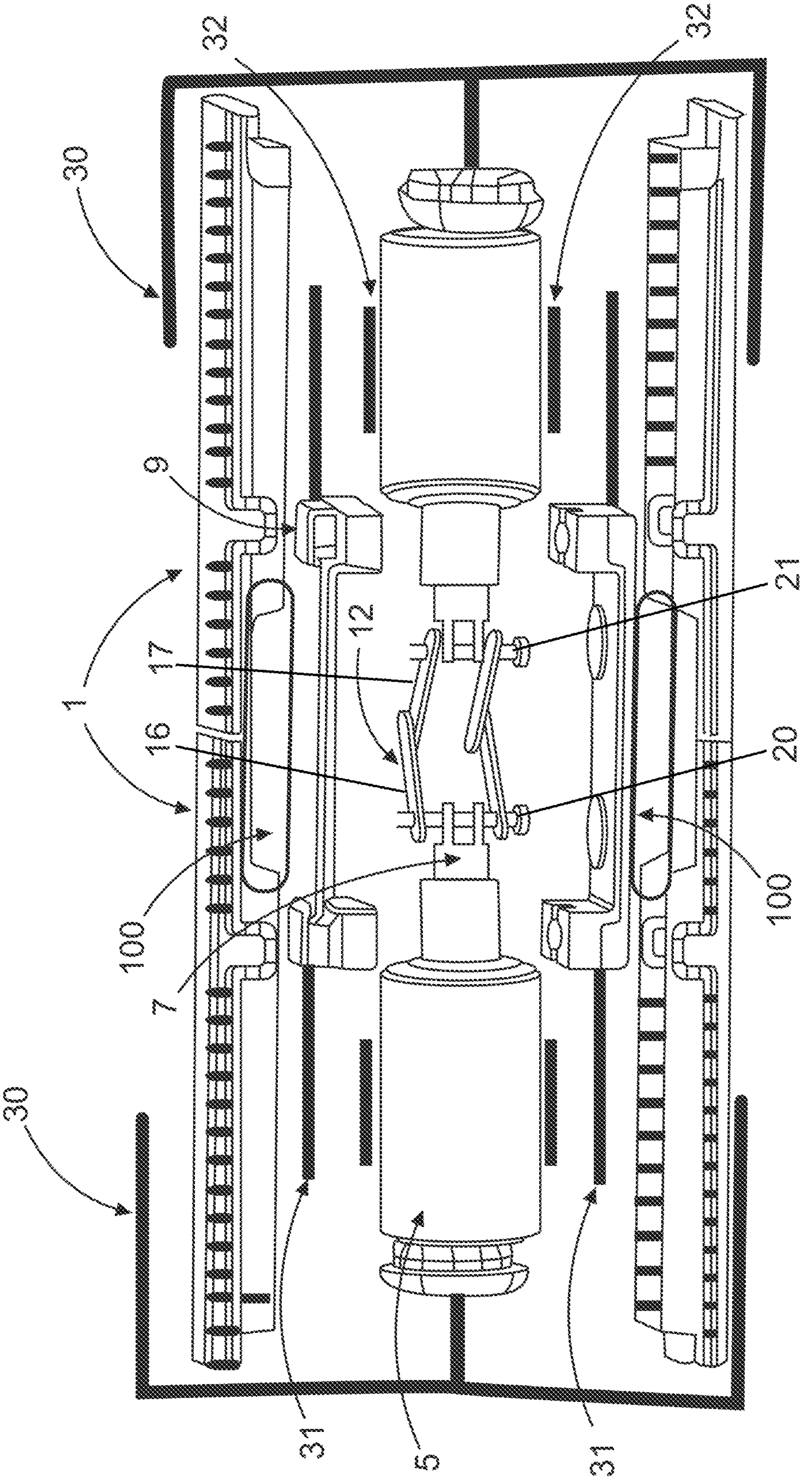

FIG. 5 shows an example of a new design of a medium voltage or high voltage circuit breaker, in accordance with the disclosure.

DETAILED DESCRIPTION OF THE INVENTION

A new medium voltage or high voltage circuit breaker is now described. In the following a medium voltage or high voltage circuit breaker is described with two vacuum interrupters in series with an interconnection part connecting them. The current new development can be utilized with more than two vacuum interrupters in series, with interconnection parts connecting adjacent vacuum interrupters.

In an example, a medium voltage or high voltage circuit breaker comprises a first terminal 2 (also called an upper terminal), a second terminal 6 (also called a lower terminal), a first vacuum interrupter 5, and a second vacuum interrupter 5. The vacuum interrupters here can be identical but need not be identical. The circuit breaker also comprises an interconnection part 9, an actuator 8, an operating rod 11, and a lever system 12. The first terminal is electrically connected to a fixed contact 3 of the first vacuum interrupter, and the second terminal is electrically connected to a fixed contact 3 of the second vacuum interrupter. The interconnection part is configured to be in electrical connection with a movable contact 4 of the first vacuum interrupter and the interconnection part is configured to be in electrical connection with a movable contact 4 of the second vacuum interrupter. The interconnection part is configured to provide a current path between the movable contacts.

Thus, upon activation the movable contacts of both vacuum interrupters are moved towards the respective fixed contacts until in a closed state the movable contacts are in contact with the fixed contacts. There is then a current path from the first terminal to the second terminal via the first vacuum interrupter, the interconnection part, and the second vacuum interrupter. A first end 18 of a first lever arm 16 of the lever system is coupled to the movable contact 4 of the first vacuum interrupter, and a second end 19 of the first lever arm 16 is coupled to the operating rod 11. A first end 18 of a second lever arm 17 of the lever system is coupled to the movable contact 4 of the second vacuum interrupter, and a second end 19 of the second lever arm 17 is coupled to the operating rod. A sliding part 20 at the first end 18 of the first lever arm 16 is supported by the interconnection part and can slide linearly within a slot 23 of the interconnection part or can move with respect to a bearing integrated into the interconnection part.

Figure 2:
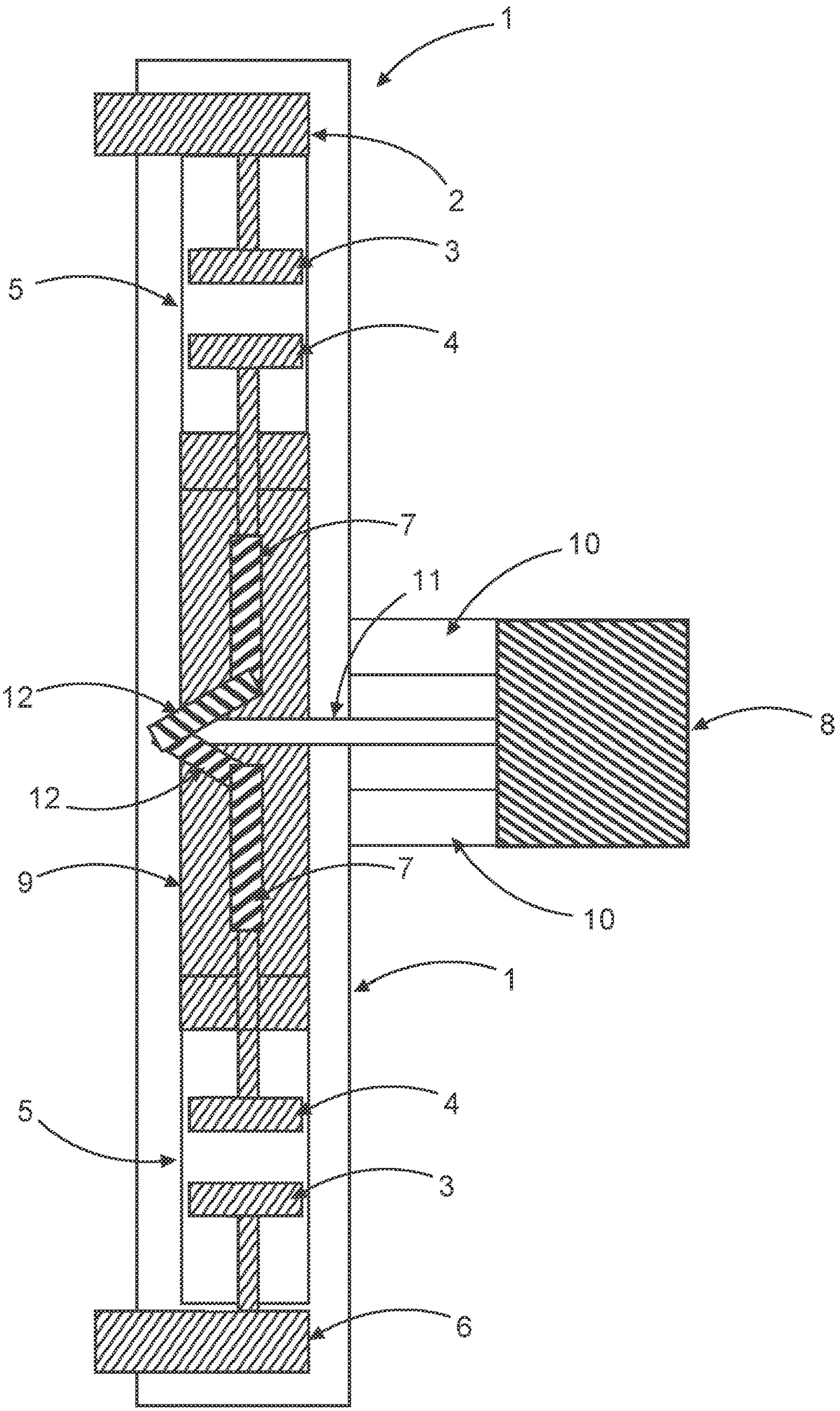
FIG. 2 shows an example of a new design of a medium voltage or high voltage circuit breaker, in accordance with the disclosure.
Figure 3A:
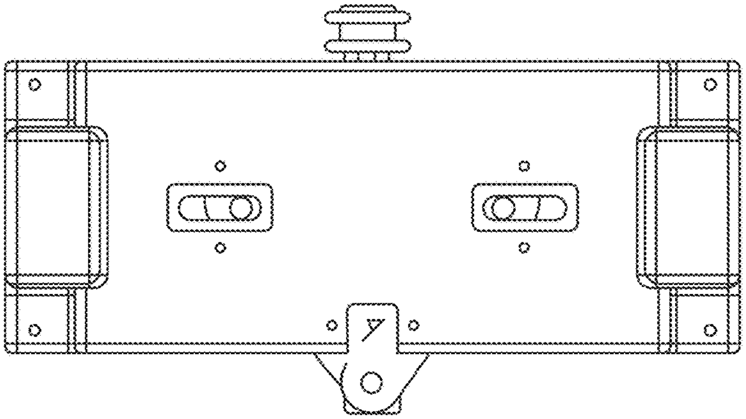
Figure 3B:
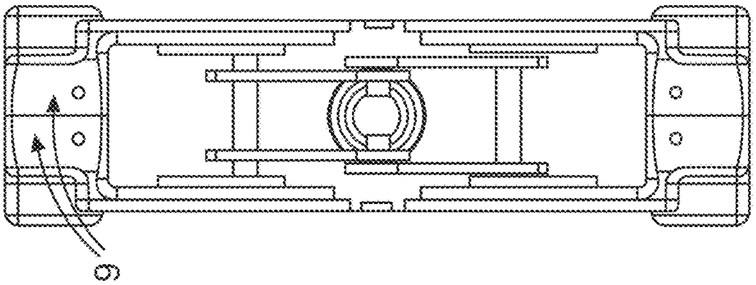
Figure 3C:
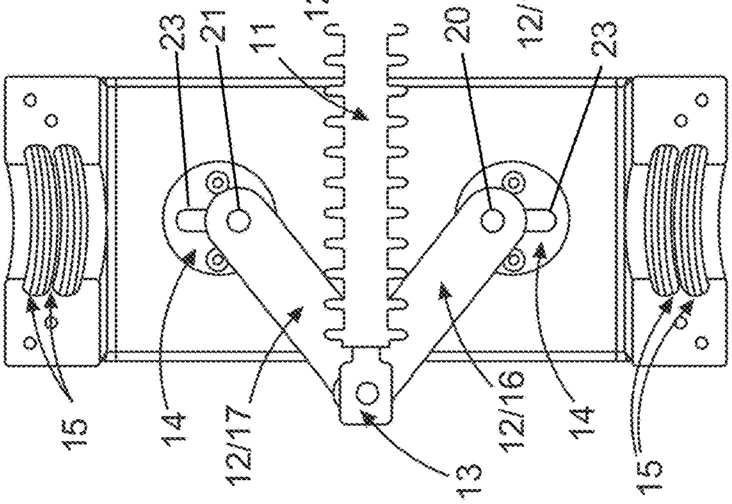
Figure 3D:
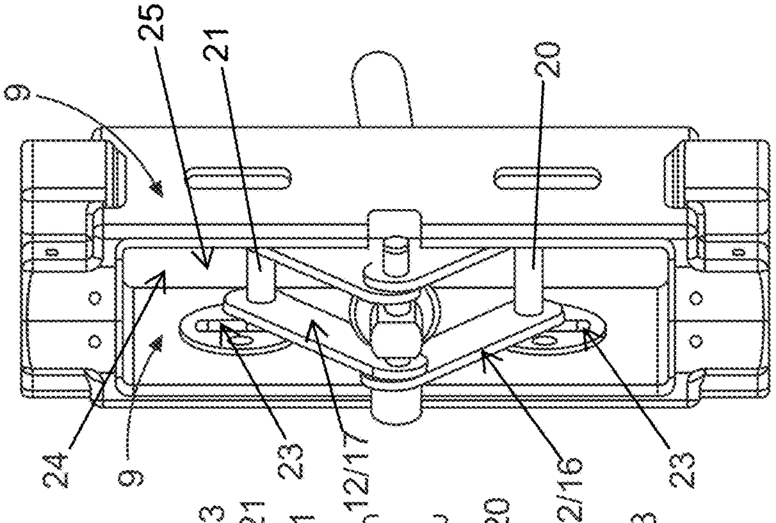

A sliding part 21 at the first end 18 of the second lever arm 17 is supported by the interconnection part and can slide linearly within a slot 23 of the interconnection part or can move with respect to a bearing integrated into the interconnection part. This is shown clearly in FIGS. 2-3, where in a specific embodiment shown the first and second lever arms 16, 17 are each doubled with an axle going through both sets at one end and attached to the operating rod enabling the first and second lever arm 16, 17 pairs to rotate with respect to the operating rod. At the other end each pair of the lever arms has another axle that has ends that go into slots 23 in opposite walls of the interconnection part enabling the ends of the lever arms 16, 17 to translate upwards and downwards as the lever arms 16, 17 are angled through the other ends of the lever arms being pulled sideways. The ends 19 of the lever arms moving upwards and downwards are coupled to the ends movable contacts via pushrods 7, enabling the lever arms to move the movable contacts towards and away from the fixed contacts simultaneously. The push rod 7, the lever arms of the lever system 12 and the operating rod can all be of an insulating material (or one of them can be) in order that the actuator is electrically isolated from the movable contacts. Thus, in a transition from an open state to the closed state the actuator is configured to move the operating rod to move the second end of the first lever arm and the second end of the second lever arm such that the slidable part 20 at the first end 18 of the first lever arm 16 and the slidable part 21 at the first end 18 of the second lever arm 17 move simultaneously within their corresponding slots 23 away from one another or with respect to their corresponding bearings away from one another.

Thus, the second vacuum interrupter is connected in series with the first vacuum interrupter, and in a closed state current can flow from the first terminal to the second terminal when movable contacts of both vacuum interrupters are brought into contact with fixed contacts of both vacuum interrupters.

In an example, the first vacuum interrupter is identical to the second vacuum interrupter.

According to an example, the slidable part at the first end of the first lever arm and the slidable part at the first end of the second lever arm move simultaneously within their corresponding slots or with respect to their corresponding bearings away from one another over the same distance.

According to an example, the interconnection part is configured to be in electrical connection with the movable contact of the first vacuum interrupter and the interconnection part is configured to be in electrical connection with the movable contact of the second vacuum interrupter during at least part of the transition from the open state to the closed state.

According to an example, the interconnection part is configured to be in electrical connection with the movable contact of the first vacuum interrupter and the interconnection part is configured to be in electrical connection with the movable contact of the second vacuum interrupter.

As shown in FIG. 3, this can be provided via “sliding” current carrying elements 15, such as a spiral contact or multilamellar, or contact band that can be fixed between the movable stem of the movable contact and the interconnection part 9. Thus, a drive rod of a movable contact 4, that is coupled to a push rod 7, can slide within the sliding current carrying elements 15 and there is an electrical connection from the stem of the movable contact 4 to the interconnection part 9. The electrical connection can be always established, such that the movable contact is always in electrical connection with the interconnection part, but it can be only in electrical connection towards the end of its drive as it approaches the fixed contact and when it is in contact with the fixed contact.

According to an example, in a transition from the closed state to the open state the actuator is configured to move the operating rod to move the second end of the first lever arm and the second end of the second lever arm such that the slidable part at the first end of the first lever arm and the slidable part at the first end of the second lever arm move simultaneously within their corresponding slots or with respect to their corresponding bearings towards one another.

According to an example, the slidable part at the first end of the first lever arm and the slidable part at the first end of the second lever arm move simultaneously within their corresponding slots or with respect to their corresponding bearings towards one another over the same distance.

Thus, the ends of the lever arms can move within slots as shown in the figures, however the ends can move with respect to or in bearings or similar that are integrated into the interconnection part, which can lead to a reduction in friction with respect to movement in a slot.

According to an example, the interconnection part is configured to be in electrical connection with the movable contact of the first vacuum interrupter and the interconnection part is configured to be in electrical connection with the movable contact of the second vacuum interrupter.

According to an example, the current path between the movable contacts is provided by at least one wall of the interconnection part.

According to an example, one or more of the at least one wall of the interconnection part comprises ribs on the inner side and/or on the outer side.

According to an example, the interconnection part is open on a first side.

According to an example, the interconnection part is open on a second side opposite to the first side.

According to an example, the interconnection part consists of several elements. Thus, the interconnection part can be formed from several parts or elements, mechanically and electrically connected.

According to an example, the circuit breaker further comprises a housing 1 surrounding the first vacuum interrupter, the second vacuum interrupter and at least partly also the interconnection part. This is shown in FIG. 2, FIGS. 4*a*-*b*, and FIG. 5 in specific examples. The housing is spaced from the at least one wall of the interconnection part to provide at least one gap 100.

According to an example, a mounting between the actuator and the housing comprises at least one support insulator or other insulated mechanical arrangement 10.

This need not specifically be a post insulator, but it can be, but the mounting serves for mechanical support of the VIs and at the same time ensures a correct distance of medium/high voltage parts from earthed structures.

According to an example, the vacuum interrupters connected in series are not of the same or equal design.

According to an example, the lever system and/or housing and/or interconnection parts are not symmetrically designed and/or connected to both vacuum interrupters used.

Such a circuit breaker can be utilized with a medium voltage or high voltage switchgear.

The new medium voltage or high voltage circuit breaker is now described in specific detail, where reference is made to FIGS. 2-5.

Figure 1:
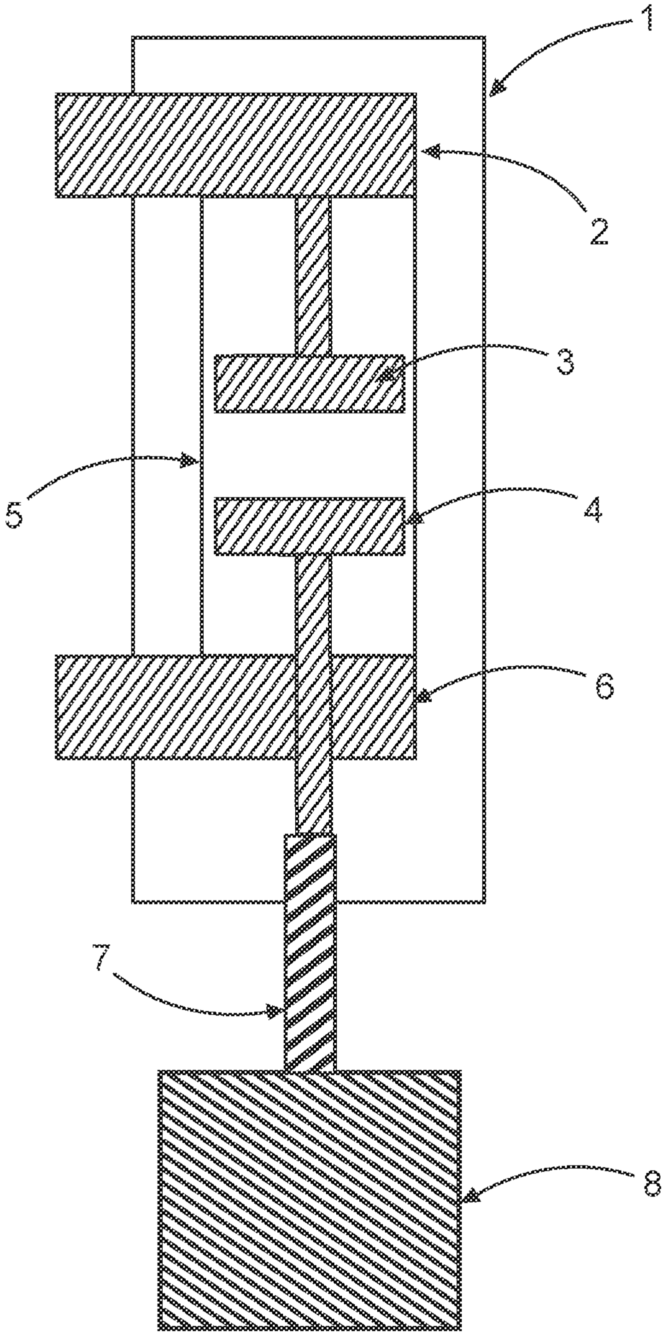
FIG. 1 shows an example of a standard design of a single-phase circuit breaker, in accordance with the disclosure.

In comparison to a single vacuum interrupter structure shown in FIG. 1, the new double vacuum interrupter circuit breaker design uses two identical vacuum interrupters 5, that interconnect their current carrying parts through a specific part 9 called an interconnection part. The vacuum interrupters can also be termed poles. Mechanical fixation of all the other parts of both poles can be either done by adaptation of their housing 1, by fixing at the upper terminal 2 and lower terminal 6 or preferably both, i.e., housing as well as terminal fixation.

Depending on a specific actuator 8 and/or pushrod 7 design, the housing may need to be supported by some electrically insulated supporting parts 10, to withstand the mechanical loads originating from the actuator 8 as well as to provide sufficient insulating distance between terminals and grounded parts of the actuator 8 or surrounding parts.

Connection of the operating rod 11 driven by an actuator is translated by the levers of a lever system 12 into the movement of pushrods 7, that are moving the movable contacts 4 of the vacuum interrupters 5. The lever system 12 has identical first and second lever arms 16, 17 that are each attached to the operating rod at one end 19 and at the other end 18 the respective lever arms are couple to the movable contacts 4 via respective push rods 7. It is to be noted that in this embodiment the two VIs are identical and the first and second lever arms 16, 17 are identical, however if the two VIs are not identical, then the first and second lever arms might also differ.

The two identical VIs 5 can both be designed for nearly half rated voltage compared to a single vacuum interrupter design, but with the same short circuit interruption current performance as a single vacuum interrupter deign. Therefore, the advantage of such a structure is, that series combination of two existing vacuum interrupters can be used for a double voltage level, without the necessity to utilize one higher voltage vacuum interrupter, what could require to design a new single vacuum interrupter for a particular rated voltage level.

Another advantage of the double vacuum interrupter structure is that the distance between the fixed and the movable contacts of the vacuum interrupters can be half in each vacuum interrupter, compared to a distance needed in the situation of a single vacuum interrupter concept. Therefore, considering the same actuator design used in both cases, the opening speed for the two vacuum interrupter designs will be much faster because of two gaps will open at the same time with same speed. Furthermore, each pushrod 7 needs to travel half the distance compared to a situation in a single VI concept.

The interconnecting part 9) interconnecting the two vacuum interrupters to be created out of two identical or similar blocks made from metal, that can carry the current flow through both vacuum interrupters arranged in series as well as provide mechanical support to the mechanism operating the push rod. At the same time, such construction enables better heat dissipation through its opening on two sides 24, 25, see FIG. 3 and transfer the current from the middle connection between both the vacuum interrupters. This design is shown clearly in FIG. 3, where each block of the interconnecting part 9 in effect has a side wall with two slots 23 in, which can be mechanical reinforced by a suitable means 14. The interconnecting block when constructed is open on both sides 24, 25, enabling cooling air flow and on one of the open sides 24, 25 the operating rod 11 enters the interconnection part 9 and is couple to the levers of the lever system 12. One end of the levers are then pushed and pulled by the operating rod 11 as it translates sideways, for example when it is rotated by the actuator 8 and passes through a threaded bearing and the other ends of the levers of the lever system 12 slide within the slots 23 perpendicularly to the translation of the operating rod 11.

Thus, the interconnection part 9 consists of two identical halves mated together. Its main functionality is to ensure proper electrical connection of the two vacuum interrupters connected in series as the whole current is flowing through both half parts. The side walls of the interconnection part 9 and its top and bottom structures provides a large surface area in the design of interconnection part 9, which enables very good heat dissipation and can be designed in addition as heat sink with ribs on the inner and/or outer side, or a suitable surface roughness, or pins, or holes for air flow or all of these. Furthermore, two half designs create an opening on the operating rod side as well as on the opposite side and therefore enables good air or gas flow through this connection, further improving the above-mentioned heat dissipation for example energy can be transferred away from the circuit breaker under current load.

As detailed above FIGS. 3*a*-3*d* show levers of a lever system 12, that translates or transforms movement of the operating rod 11 to the pushrods 7, providing necessary mechanical force, and adjusting the length of the movement which the pushrods need to take for proper on and off movement of vacuum interrupter contacts. As the identical levers of the lever system 12 are connected to each vacuum interrupter 5 via the pushrod 7, simultaneous operation of both vacuum interrupters 5 is ensured. This is of importance for successful interruption. Both levers of the operating system 12 are then connected to the operating rod 11 at the connection point/part 13. As detailed above, when we discuss both levers this refers to a lever driving the movable contact of one vacuum interrupter and one lever driving the movable contact of the other vacuum interrupter, but in fact each of these driving levers can be in the form of a pair of levers. The interconnection part 9 serves at the same time as a mechanical structure for the operating mechanism (levers). As the interconnection part 9 may not have sufficient mechanical strength on top of its electrical properties, additional mechanical reinforcement 14 (e.g., sliding bearing) parts might be necessary, but only in places of highest mechanical load or expected friction, i.e., in the closing or opening operation where the levers 12 are moving.

As detailed above, the interconnection part 9 can be built from two blocks, which can also be termed half shells. It is to be noted that each separate half shell construction enables easy insertion of parts separately and thus ensures a smooth assembly process during production of the pole.

FIGS. 4*a* and 4*b* show cross-sections of a pole assembly design of the interconnection part 9 together with two vacuum interrupters 5, pushrods 7, levers of the lever system 12, operating rod 11 from the actuator 8 and their housing 1. The housing I can also be constructed using the half shell principle as for the interconnection part 9, making the whole assembly very modular. A feature of this design is the fact that the housing shells 1 cover, at least partly, the interconnection part 9, and this helps increase the dielectric performance and further strengthens the mechanical robustness of the full assembly. A best dielectric performance can be achieved when the two housing shells 1 on each side are overlapping or connected (not shown in FIG. 4), to provide maximum dielectric coverage of the interconnection part 9 having full electric potential in case the two vacuum interrupters 5 are moved to an on position.

In order not to excessively limit the interconnection part 9 from heat exchange, small air gap 100 in-between the interconnection part 9 and housing 1 can be arranged, at least in some areas. Furthermore, ribs or pins can be added to provide the well-known effective heat sink properties. To complement FIG. 4 with a different view, FIG. 5 shows an exploded view of the main parts used within a single pole formed from two vacuum interrupters.

As shown in FIG. 5 to obtain dielectric steering on both vacuum interrupters 5 a field steering part 30 can be placed above/around or partly around the fixed contacts 3 of the vacuum interrupters 5, and even a capacitor can be used, and additional steering electrodes 31 can be used and connected to the half shell design of the interconnection part 9 formed from two blocks and/or steering electrodes 32 can be connected to a floating shielding that is within the vacuum interrupter body.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In another example, there can be a design of described circuit breaker, consisting of different VI designs connected in series, i.e., the two VIs used are not identical. This might be needed in order to achieve required dielectric and/or short-circuit current performance. They may also result in a need to have asymmetrical lever system and/or housing and/or interconnection part.

In an example, the slidable part at the first end of the first lever arm and the slidable part at the first end of the second lever arm move simultaneously within their corresponding slots or with respect to their corresponding bearings away from one another over the same distance.

In an example, the interconnection part is configured to be in electrical connection with the movable contact of the first vacuum interrupter and the interconnection part is configured to be in electrical connection with the movable contact of the second vacuum interrupter during at least part of the transition from the open state to the closed state.

In an example, the interconnection part is configured to be in electrical connection with the movable contact of the first vacuum interrupter and the interconnection part is configured to be in electrical connection with the movable contact of the second vacuum interrupter during the transition from the open state to the closed state.

In an example, in a transition from the closed state to the open state the actuator is configured to move the operating rod to move the second end of the first lever arm and the second end of the second lever arm such that the slidable part at the first end of the first lever arm and the slidable part at the first end of the second lever arm move simultaneously within their corresponding slots or with respect to their corresponding bearings towards one another.

In an example, the slidable part at the first end of the first lever arm and the slidable part at the first end of the second lever arm move simultaneously within their corresponding slots or with respect to their corresponding bearings towards one another over the same distance.

In an example, the interconnection part is configured to be in electrical connection with the movable contact of the first vacuum interrupter and the interconnection part is configured to be in electrical connection with the movable contact of the second vacuum interrupter during at least part of the transition from the closed state to the open state.

In an example, the interconnection part is configured to be in electrical connection with the movable contact of the first vacuum interrupter and the interconnection part is configured to be in electrical connection with the movable contact of the second vacuum interrupter during the transition from the closed state to the open state.

In an example, the current path between the movable contacts is provided by at least one wall of the interconnection part.

In an example, one or more of the at least one wall of the interconnection part comprises ribs on the inner side and/or on the outer side.

In an example, the interconnection part is open on a first side.

In an example, the interconnection part is open on a second side opposite to the first side.

In an example, the interconnection part consists of several elements.

In an example, the circuit breaker further comprises a housing surrounding the first vacuum interrupter, the second vacuum interrupter and the interconnection part. The housing is spaced from the at least one wall of the interconnection part. This provides at least one gap.

In an example, a mounting between the actuator and the housing comprises at least one support insulator or other mechanical structure that ensures sufficient mechanical strength during switching operations of the breaker.

Therefore, a series connection of two VIs, each that can be designed for a lower voltage than a full voltage requirement of the overall circuit breaker, provides for an easier alternative to a single VI designed for higher voltage and provides for a more robust interruption due to a double gap arrangement provided by each VI.

In an example, the vacuum interrupters connected in series are not of the same or equal design.

In an example, the lever system and/or housing and/or interconnection parts are not symmetrically designed and/or connected to both vacuum interrupters used.

Thus, a design is provided with an interconnection part, which is a part interconnecting two vacuum interrupters (VIs) that are electrically connected in series. This interconnection part interconnecting the two VIs is designed not only for current carrying functionality, but at the same time provides for improved heat exchange and provides for mechanical fixation of the movable parts like current carrying flexible part or sliding current connection to the movable contacts and provides for support means for a lever system that is used to move the movable contacts. The housing is used to improve the dielectric withstand between two phases/poles as well as for the higher mechanical strength. Furthermore, the interconnecting part can be connected to or associated with a heat pipe device to lead the heat from that "hot spot" area to an area where the heat dissipation at the switchgear can be done. That will give the opportunity to increase further the rated current flow throughout the interconnecting part. The heat pipe can be placed even on both ends of the first and the second VI to lower the temperature on both pole ends.

In a second aspect, there is provided a medium voltage or high voltage switchgear comprising at least one circuit breaker according to the first aspect.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising." "having." "including." and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A medium voltage or high voltage circuit breaker, comprising:

a first terminal;

a second terminal;

a first vacuum interrupter;

a second vacuum interrupter;

an interconnection part;

an actuator;

an operating rod; and a lever system;

wherein the first terminal is electrically connected to a first fixed contact of the first vacuum interrupter, and wherein the second terminal is electrically connected to a second fixed contact of the second vacuum interrupter;

wherein the interconnection part is configured to be in electrical connection with a first movable contact of the first vacuum interrupter and the interconnection part is configured to be in electrical connection with a second movable contact of the second vacuum interrupter when the circuit breaker is in a closed state when the first and second movable contacts are in contact with the respective first and second fixed contacts, and wherein the interconnection part is configured to provide a current path between the first and second movable contacts, wherein the interconnecting part is opened on a first side;

wherein a first end of a first lever arm of the lever system is coupled to the first movable contact of the first vacuum interrupter, and wherein a second end of the first lever arm is coupled to the operating rod;

wherein a first end of a second lever arm of the lever system is coupled to the second movable contact of the second vacuum interrupter, and wherein a second end of the second lever arm is coupled to the operating rod;

wherein a first sliding part at the first end of the first lever arm is supported by the interconnection part and can slide linearly within a first sliding support on the interconnection part;

wherein a second sliding part at the first end of the second lever arm is supported by the interconnection part and can slide linearly within a second sliding support on the interconnection; and wherein in a transition from an open state to the closed state the actuator is configured to move the operating rod to move the second end of the first lever arm and the second end of the second lever arm such that the first sliding part at the first end of the first lever arm and the second sliding part at the first end of the second lever arm move simultaneously within the first and second sliding supports respectively away from one another.

2. The circuit breaker according to claim 1, wherein the first sliding part at the first end of the first lever arm and the second sliding part at the first end of the second lever arm move simultaneously within the first and second sliding supports respectively another over a same distance.

3. The circuit breaker according to claim 1, wherein the interconnection part is configured to be in electrical connection with the first movable contact of the first vacuum interrupter and the interconnection part is configured to be in electrical connection with the second movable contact of the second vacuum interrupter during at least part of the transition from or to the open state to the closed state.

4. The circuit breaker according to claim 1, wherein in a transition from the closed state to the open state the actuator is configured to move the operating rod to move the second end of the first lever arm and the second end of the second lever arm such that the first sliding part at the first end of the first lever arm and the second sliding part at the first end of the second lever arm move simultaneously within the first and second sliding supports respectively towards one another.

5. The circuit breaker according to claim 4, wherein the first sliding part at the first end of the first lever arm and the second sliding part at the first end of the second lever arm move simultaneously within the first and second sliding supports respectively over a same distance.

6. The circuit breaker according to claim 4, wherein the interconnection part is configured to be in electrical connection with the first movable contact of the first vacuum interrupter and the interconnection part is configured to be in electrical connection with the second movable contact of the second vacuum interrupter during at least part of the transition from the closed state to the open state.

7. The circuit breaker according to claim 1, wherein the current path between the first and second movable contacts is provided by at least one wall of the interconnection part.

8. The circuit breaker according to claim 7, further comprising a housing surrounding the first vacuum interrupter, the second vacuum interrupter and the interconnection part, and wherein the housing is spaced from at least a portion of the at least one wall of the interconnection part to provide at least one gap.

9. The circuit breaker according to claim 8, wherein a mounting between the actuator and the housing comprises at least one supporting and insulating part.

10. The circuit breaker according to claim 1, wherein the interconnection part is open on a second side opposite to the first side.

11. The circuit breaker according to claim 1, wherein the interconnection part assembled from several elements.

12. The circuit breaker according to claim 1, wherein the vacuum interrupters connected in series are of different electrical design.

13. The circuit breaker of claim 1, wherein the first sliding support and the second sliding support are one or more of a slot and a sliding bearing included on the interconnection part.

* * * * *